(No Model.)
J. RICHARDS.
CHURN.
No. 382,387. Patented May 8, 1888.
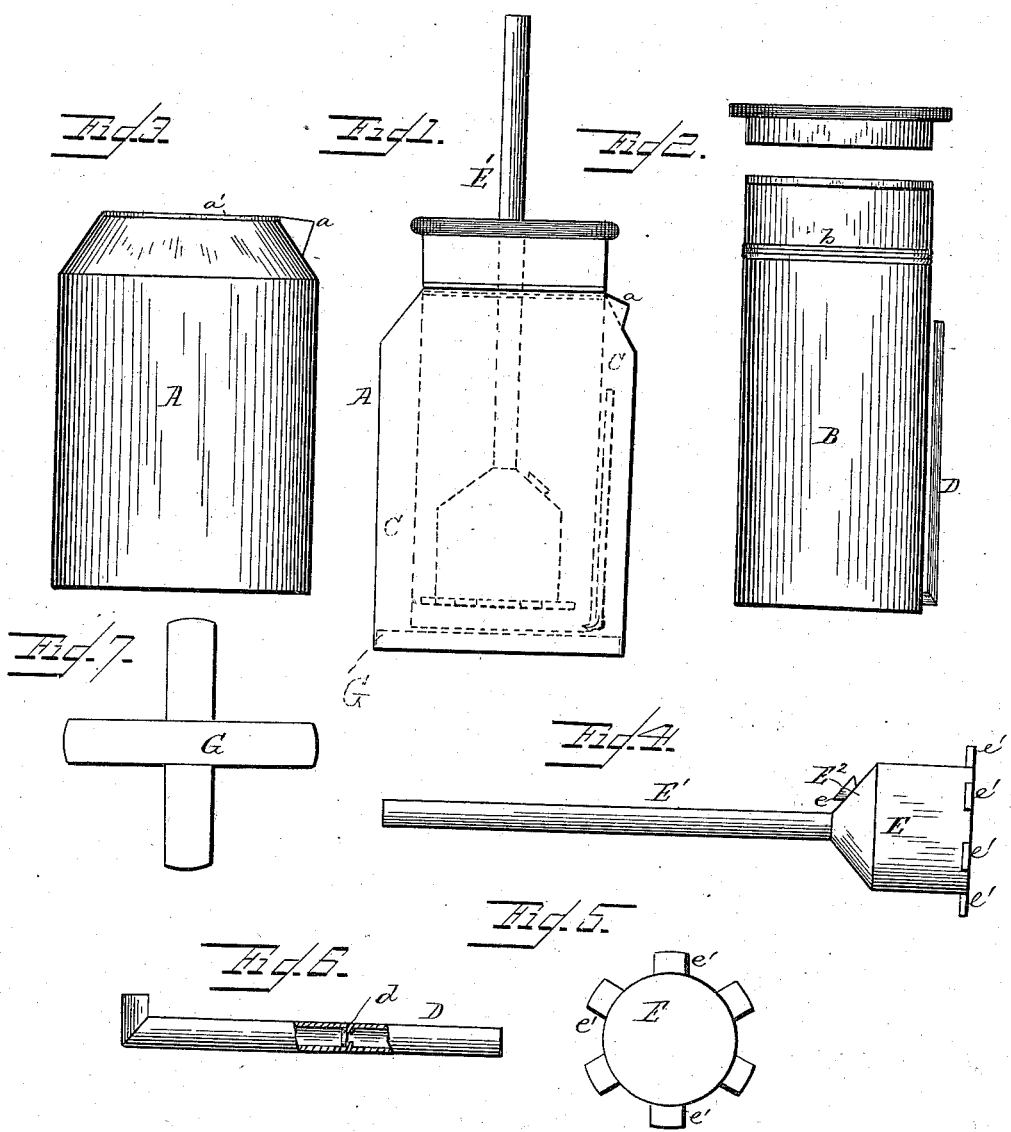

UNITED STATES PATENT OFFICE.

JOHN RICHARDS, OF FORT WORTH, TEXAS, ASSIGNOR OF TWO-THIRDS TO ZACK J. REESE AND J. D. SINCLAIR, OF SAME PLACE.

CHURN.

SPECIFICATION forming part of Letters Patent No. 382,387, dated May 8, 1888.

Application filed July 5, 1887. Serial No. 243,388. (No model.)

*To all whom it may concern:*

Be it known that I, JOHN RICHARDS, a citizen of the United States, residing at Fort Worth, in the county of Tarrant, State of Texas, have invented certain new and useful Improvements in Churns, of which the following is a specification, reference being had therein to the accompanying drawings.

My invention relates to improvements in churns.

My invention consists in the combination of an inner shell or cream-receptacle having a pipe formed therewith, and with a ring near its upper end, an outer shell having its end contracted to engage the ring of the cream-receptacle and inclose the pipe and provided with a side opening at its upper end, and a valve located in the pipe to open and close by the action of the dasher moving in the cream-cylinder, all as hereinafter described and claimed.

In the accompanying drawings, Figure 1 is a view of the churn complete, showing in dotted lines the inner or cream cylinder or shell; also the dasher. Fig. 2 is a view of the inner or cream cylinder and cover for the same, showing the air-tube by which air is admitted to said shell. Fig. 3 is a view of the outer shell. Fig. 4 is a view of the dasher. Fig. 5 is a bottom view of the same. Fig. 6 is a view of the air-tube, showing the check-valve for regulating the admission of air to the shell; and Fig. 7 is a view of the support on which the cream shell or cylinder rests.

The outer shell or cylinder, A, is made in any preferred form, with its upper end contracted to fit closely around the inner shell or cylinder, B, and is provided with a rim, $a'$, and also with an opening, $a$, for the passage of air to the tube hereinafter referred to, or for the extension of said tube outward to the air. The inner shell or cream-cylinder is preferably made of the same diameter throughout its entire length, and is provided near its upper end with a corrugation or ring, $b$, to be engaged by the rim $a'$ on the upper end of the shell A, and by which it is closely embraced; said shells or cylinders being so constructed as to leave or form a space, C, between the walls thereof, as shown.

A tube, D, is connected at the bottom of the shell or cream-cylinder B and extends upward to such length as to either pass out through the opening $a$, or in close proximity thereto, to provide a communication between the inner shell and the outer atmosphere. This tube D is provided with a suitable check-valve, $d$, which is arranged in such manner that when the dasher is raised and a partial vacuum is formed in the lower part of the cream-cylinder the valve will open to admit air to the tube and thence to the cream-shell, and will close when the dasher is depressed in a manner that will be readily understood.

The dasher consists of an enlarged head, E, preferably in cylindrical form and hollow, provided with a handle, E', as shown. This dasher is provided with an opening, $E^2$, at the top or side, as shall be found most desirable, which opening is provided with a screw-cap, $e$, to tightly close said opening, and through which opening the dasher is supplied with water of proper temperature to facilitate the action of churning.

The dasher is provided at its lower edge, projecting from its peripheral face, with blades or paddles $e'$, to act upon the cream in a manner similar to the paddles now in use and in a manner that will be readily understood.

The inner shell when in position rests upon a suitable rack, G, (shown in Fig. 7,) which permits the water to circulate under the bottom of said shell.

The operation of the device is as follows: The inner shell being filled with cream, the space between the two shells is filled with either hot or cold water, as the nature of the case shall require, as also the dasher, and the dasher is reciprocated in the usual manner. The quick upstroke of the dasher produces a partial vacuum at the bottom of the inner shell, which causes the valve to open and the air to pass through the tube into said shell and upon the downstroke to close, causing the air to be forced up into and through the cream, acting thereon in a manner that will be readily understood.

The water between the shells and in the dasher is kept at the proper temperature at all times to produce the best results.

Having now described my invention, I claim—

The combination of the inner shell or cream-receptacle having the pipe D formed therewith, and with the ring near its upper end, the outer shell having its upper end contracted to engage the ring of the cream-receptacle and inclose the pipe, and provided with the side opening, a, at its upper end, and a valve located in the pipe D to open and close by the action of the dasher moving in the cream-cylinder, substantially as set forth.

In testimony whereof I affix my signature in presence of two witnesses.

JOHN RICHARDS.

Witnesses:
MARK M. BARNES,
J. R. JETER.